(12) United States Patent
Freytsis et al.

(10) Patent No.: US 10,321,490 B2
(45) Date of Patent: Jun. 11, 2019

(54) SYSTEMS AND METHODS FOR MAINTAINING AN AMBIENT MONITORING SESSION

(71) Applicant: MOTOROLA SOLUTIONS, INC., Chicago, IL (US)

(72) Inventors: Ilya Freytsis, Swampscott, MA (US); Madhusudan K. Pai, Palatine, IL (US)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 191 days.

(21) Appl. No.: 15/365,656

(22) Filed: Nov. 30, 2016

(65) Prior Publication Data

US 2018/0152971 A1    May 31, 2018

(51) Int. Cl.
*H04W 72/04*    (2009.01)
*H04W 76/10*    (2018.01)
(Continued)

(52) U.S. Cl.
CPC ............. *H04W 76/10* (2018.02); *H04W 4/10* (2013.01); *H04W 76/30* (2018.02)

(58) Field of Classification Search
CPC ..... H04W 76/10; H04W 76/30; H04W 76/06; H04W 4/10; H04W 76/02
See application file for complete search history.

(56) References Cited

U.S. PATENT DOCUMENTS 5,673,259 A * 9/1997 Quick, Jr. ......... H04W 74/0866
370/311

5,675,630 A * 10/1997 Beatty ................. H04M 1/2745
379/355.05
(Continued)

FOREIGN PATENT DOCUMENTS

EP        700627       3/1996
EP       1536660       6/2005
(Continued)

OTHER PUBLICATIONS

3GPP TSG SA WG6, "Answers to questions from CTI joint session on Release 14 MCPTT", 3rd Generation Partnership Project (3GPP), C4-171078, Feb 13, 2017. Available from http://www.3gpp.org/ftp/Meetings_3GPP_SYNC/CT4/Docs/ [Accessed Mar. 21, 2017]. See Topic-5.
(Continued)

*Primary Examiner* — Christine Ng
(74) *Attorney, Agent, or Firm* — Michael Best & Friedrich LLP

(57) ABSTRACT

A method and system for maintaining ambient monitoring capability for a communication device. The method includes using a first target identity to identify the communication device in a first ambient monitoring session with an ambient monitoring device. The method also includes, while in the first ambient monitoring session, receiving, by an electronic processor of the communication device, a communication service state change notification for the first target identity. The method also includes, while in the first ambient monitoring session, determining a second target identity to identify the communication device in a second ambient monitoring session that has not been established. The method also includes, while in the first ambient monitoring session, transmitting, to the ambient monitoring device, the second target identity.

20 Claims, 5 Drawing Sheets

(51) Int. Cl.
*H04W 76/30* (2018.01)
*H04W 4/10* (2009.01)

(56) References Cited

U.S. PATENT DOCUMENTS

| | | | |
|---|---|---|---|
| 5,802,457 | A | 9/1998 | Heiskari et al. |
| 6,006,104 | A * | 12/1999 | Metroka ............... H04W 88/06 |
| | | | 455/411 |
| 6,243,575 | B1 * | 6/2001 | Ohyama ............... H04W 60/04 |
| | | | 455/456.4 |
| 7,983,705 | B1 * | 7/2011 | Chen ................. H04L 29/12066 |
| | | | 455/518 |
| 8,291,481 | B2 | 10/2012 | Das et al. |
| 8,571,539 | B1 | 10/2013 | Ranganathan et al. |
| 2007/0136422 | A1 * | 6/2007 | Ohtani .............. H04L 29/06027 |
| | | | 709/204 |
| 2010/0022267 | A1 * | 1/2010 | Hossain ................ H04M 15/00 |
| | | | 455/551 |

FOREIGN PATENT DOCUMENTS

| | | |
|---|---|---|
| EP | 2693811 | 2/2014 |
| GB | 2415862 | 1/2006 |
| WO | 9526614 | 10/1995 |

OTHER PUBLICATIONS

3GPP TS 23.379 V0.3.0, "Mission Critical Push to Talk (MCPTT)", 3rd Generation Partnership Project (3GPP), Oct. 2016. Available from http://www.3gpp.org/ftp/tsg_sa/WG6_MissionCritial/Latest_draft_SA6_Specs/archive/ [Accessed Mar. 21, 2017]. See section 10.14—Ambient listening call.

European Standard (Telecommunications series), "Ambience Listening (AL)", ETSI EN 300 392-10-21 V12.0, Terrestial Trunked Radio (TETRA); Part 10: Supplementary services stage 1; Sub-part 21: Ambience Listening (AL), version 1.2.0, Apr. 2003.

GB17182296 Combined Search and Examination Report dated Mar. 29, 2018 (3 pages).

* cited by examiner

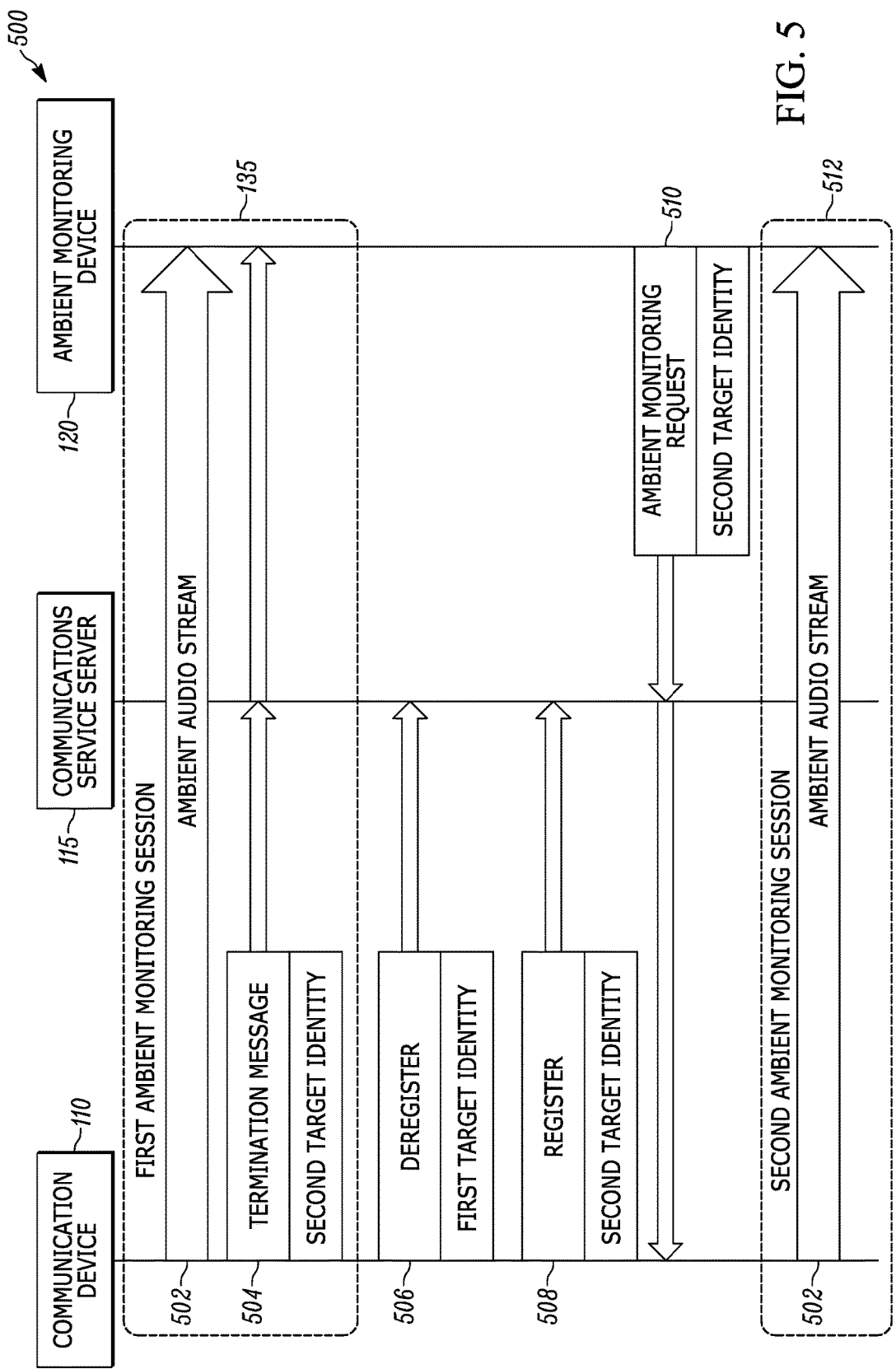

SYSTEMS AND METHODS FOR MAINTAINING AN AMBIENT MONITORING SESSION

BACKGROUND OF THE INVENTION

Public safety agencies responding to an incident (for example a building fire, a criminal pursuit or other law enforcement activity, a natural disaster, a medical incident, and the like) may coordinate response efforts using wireless communication devices. Some wireless communication devices (for example, mobile telephones and two-way radios) include a push-to-talk function, which is used to transmit simplex audio from one communication device to one or more other communication devices (for example, using a talk group) within a public safety communications system. Some public safety communications systems include an ambient monitoring service, which allows an ambient monitoring device to remotely activate the push-to-talk function of a communications device and receive the ambient audio sensed in the vicinity of the communication device. For example, a law enforcement officer may not be able to actively communicate, yet communications from the situation to other public safety personnel may be desirable (for example, a hostage situation). In such case, the other personnel may use the ambient monitoring service to receive and listen to the ambient sounds from the situation, for example, via an ambient monitoring session to a mobile radio.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

FIG. 5 is a message flow diagram for the system of FIG. 1 in accordance with some embodiments.

Figure 1:
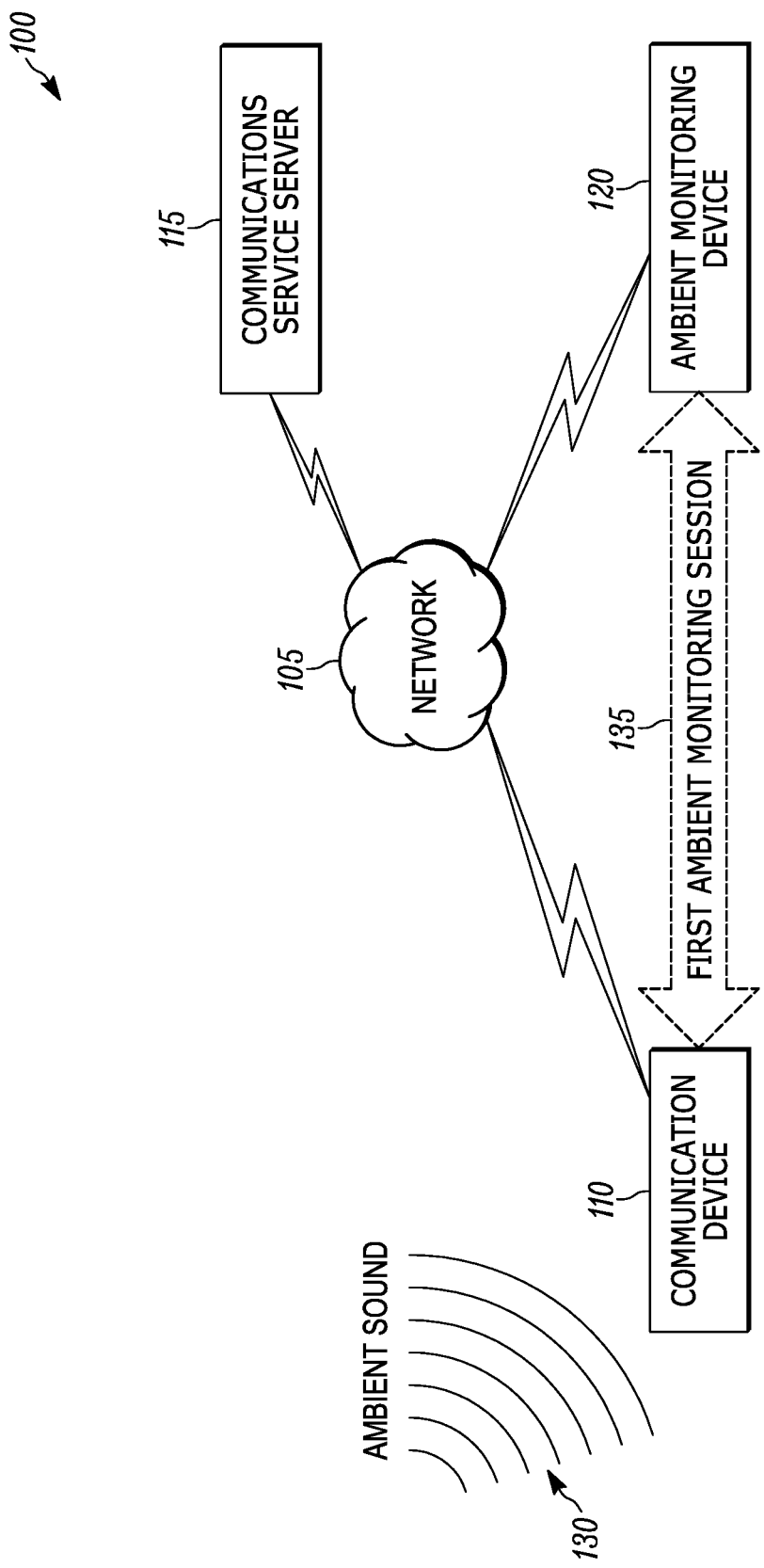
FIG. 1 is a block diagram of a system for maintaining ambient monitoring capability for a communication device in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

Communication devices (for example, mobile telephones, two-way radios, or converged devices) may include a push-to-talk (PTT) function, which is used to transmit simplex audio from one communication device to one or more other communication devices (for example, using a talk group) within a public safety communications network. The push-to-talk function of a communications device is uniquely identified within a communications network using a target identity. Target identities may identify a specific user of the communication device, or may identify the device itself. Accordingly, the target identity may change as users log in and out of the communications device. Additionally, converged devices (that is, devices capable of communicating on both cellular and land mobile radio (LMR) networks) have push-to-talk service target identifiers on more than one network. As a consequence the target identifier may change as the device migrates between networks (for example, because of varying signal strength levels). An ambient monitoring session with a communication device allows an ambient monitoring device to remotely activate the push-to-talk function of the communications device, and receive the ambient audio sensed in the vicinity of the communication device. An ambient monitoring session is established using the target identifier of the communication device. However, because the target identity of a communication device may change during an ambient listening session, the ambient listening session may terminate. Accordingly, because it may be desirable to continue monitoring a situation despite a change in target identity, systems and methods are provided herein for maintaining ambient monitoring capability for a communication device.

One exemplary embodiment provides a method for maintaining ambient monitoring capability for a communication device. The method includes using a first target identity to identify the communication device in a first ambient monitoring session with an ambient monitoring device. The method also includes, while in the first ambient monitoring session, receiving, by an electronic processor of the communication device, a communication service state change notification for the first target identity. The method also includes, while in the first ambient monitoring session, determining a second target identity to identify the communication device in a second ambient monitoring session that has not been established. The method also includes, while in the first ambient monitoring session, transmitting, to the ambient monitoring device, the second target identity.

Another exemplary embodiment provides a system for maintaining ambient monitoring capability for a communication device. The system includes a communication device, which includes a transceiver and an electronic processor. The electronic processor is configured to use a first target identity to identify the communication device in a first ambient monitoring session with an ambient monitoring device. The electronic processor is also configured to, while in the first ambient monitoring session, receive a communication service state change notification for the first target identity. The electronic processor is also configured to, while in the first ambient monitoring session, determine a second target identity to identify the communication device in a second ambient monitoring session that has not been established. The electronic processor is also configured to, while in the first ambient monitoring session, transmit, to the ambient monitoring device via the transceiver, the second target identity.

For ease of description, some or all of the exemplary systems presented herein are illustrated with a single exemplar of each of its component parts. Some examples may not describe or illustrate all components of the systems. Other exemplary embodiments may include more or fewer of each of the illustrated components, may combine some components, or may include additional or alternative components.

FIG. 1 is a block diagram of an exemplary system 100 for maintaining ambient monitoring capability for a communication device. The system 100 includes a network 105, a communication device 110, a communications service server 115, and an ambient monitoring device 120. The components of the system 100 are communicatively coupled via the network 105. The network 105 is a communications network including wireless and wired connections. The network 105 may include a land mobile radio (LMR) network, and a cellular network (for example, a Long Term Evolution (LTE) network). However, the concepts and techniques embodied and described herein may be used with networks using other protocols, for example, Global System for Mobile Communications (or Groupe Special Mobile (GSM)) networks, Code Division Multiple Access (CDMA) networks, Evolution-Data Optimized (EV-DO) networks, Enhanced Data Rates for GSM Evolution (EDGE) networks, 3GSM networks, 4GSM networks, and other suitable networks, including future-developed network architectures. The communication device 110, the communications service server 115, and the ambient monitoring device 120 communicate with each other over the network 105 using suitable wired and wireless communications protocols. In some embodiments, communications with other external devices (not shown) occur over the network 105.

Figure 2:
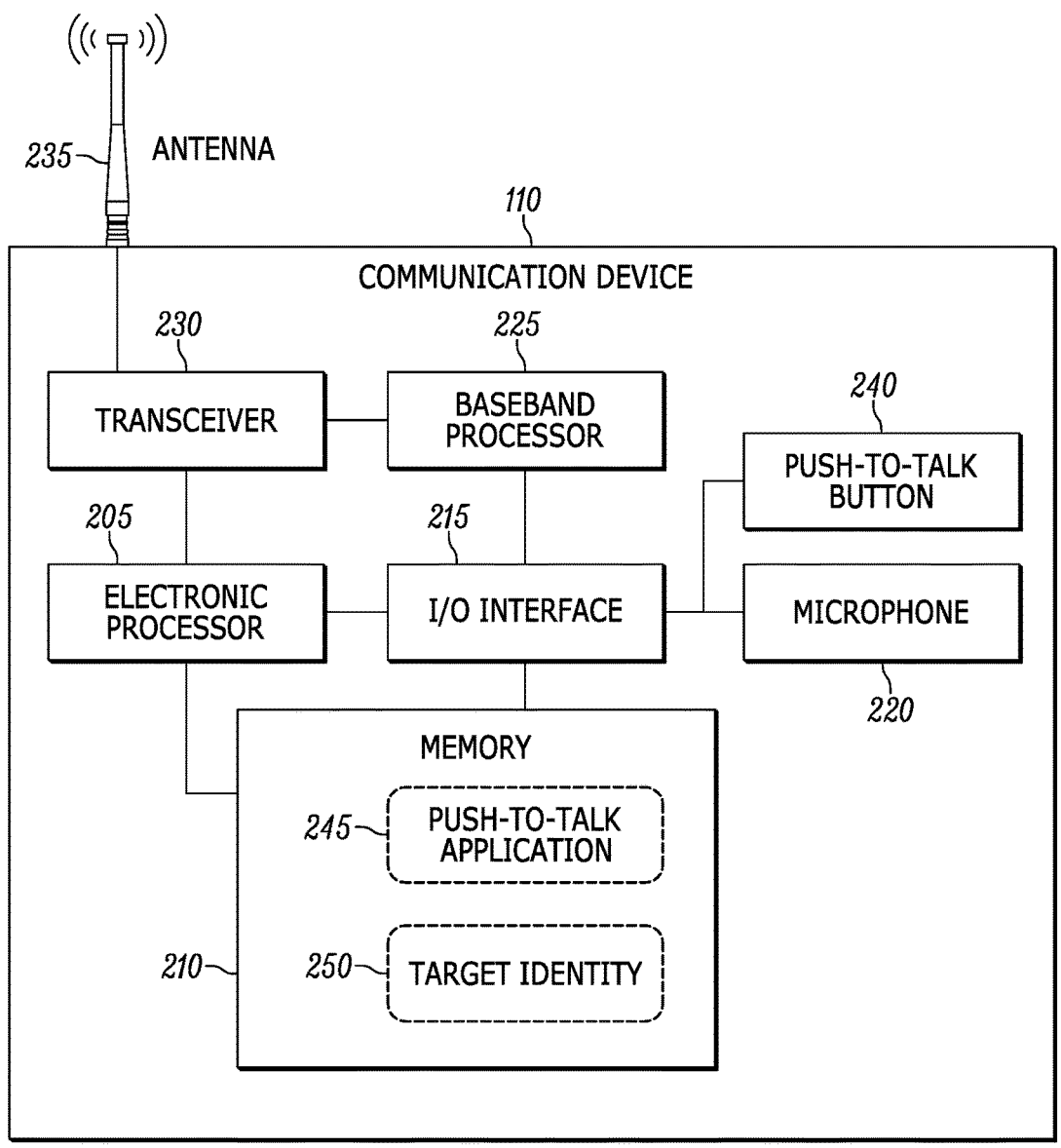
FIG. 2 is a block diagram of a communication device in accordance with some embodiments.

The communication device 110, described more particularly below with respect to FIG. 2, is a wireless communication device that includes hardware and software that enable it to communicate via the network 105. As described in more detail below, the communication device 110 includes push-to-talk capability.

The communications service server 115 includes hardware and software that allow the communication device 110 and the ambient monitoring device 120 to communicate through the network 105 via a wired connection, a wireless connection, or a combination both. The communications service server 115 controls elements of the network 105 to establish and eliminate communications channels between devices on the network 105. In one example, the communications service server 110 is a push-to-talk server for controlling push-to-talk sessions on the network 105. Devices (for example, the communication device 110 and the ambient monitoring device 120) wishing to communicate through the network 105 using push-to-talk functionality register and deregister with communications service server 115 using target identities. The communications service server 110 tracks the push-to-talk registrations and controls elements of the network 105 to establish push-to-talk communications sessions between devices based on the target identities.

In some embodiments, the ambient monitoring device 120 is a communication device similar to the communication device 110. In other embodiments, the ambient monitoring device 120 is a computer, for example, a public safety dispatch console. The ambient monitoring device 120 may be communicatively coupled to the network 105 using a wired or wireless connection. As described in more detail below, the ambient monitoring device 120 receives, from the communication device 110, audio produced by ambient sound 130 in the vicinity of the communication device 110 via a first ambient monitoring session 135. The ambient monitoring device 120 includes hardware and software for establishing the first ambient monitoring session 135, receiving and decoding the audio, and presenting the audio to one or more listeners. Ambient monitoring sessions (for example, ambient listening sessions) are established using known techniques including, for example, establishing a push-to-talk simplex audio call between the ambient monitoring device 120 and the communication device 110 based on a target identity of the communication device 110.

FIG. 2 is a block diagram of an exemplary embodiment of the communication device 110. In the embodiment illustrated, the communication device 110 includes an electronic processor 205, a memory 210, an input/output interface 215, a microphone 220, a baseband processor 225, a transceiver 230, an antenna 235, and a push-to-talk button 240. The illustrated components, along with other various modules and components are coupled to each other by or through one or more control or data buses that enable communication therebetween. The use of control and data buses for the interconnection between and exchange of information among the various modules and components would be apparent to a person skilled in the art in view of the description provided herein.

The electronic processor 205 obtains and provides information (for example, from the memory 210 and/or the input/output interface 215), and processes the information by executing one or more software instructions or modules, capable of being stored, for example, in a random access memory ("RAM") area of the memory 210 or a read only memory ("ROM") of the memory 210 or another non-transitory computer readable medium (not shown). The software can include firmware, one or more applications, program data, filters, rules, one or more program modules, and other executable instructions. The electronic processor 205 is configured to retrieve from the memory 210 and execute, among other things, software related to the control processes and methods described herein. As described in detail below, the electronic processor 205 is configured to control the transceiver 230 to transmit and receive audio signals and messages to and from the communication device 110.

The memory 210 can include one or more non-transitory computer-readable media, and includes a program storage area and a data storage area. The program storage area and the data storage area can include combinations of different types of memory, as described herein. In the embodiment illustrated, the memory 210 stores, among other things, a push-to-talk application 245 and a target identity 250.

The input/output interface 215 is configured to receive input and to provide system output. The input/output interface 215 obtains information and signals from, and provides information and signals to, (for example, over one or more wired and/or wireless connections) devices both internal and external to the communication device 110.

The microphone 220 is capable of sensing sound, converting the sound to electrical signals, and transmitting the electrical signals to the electronic processor 205 via the input/output interface 215. The electronic processor 205 processes the electrical signals received from the microphone 220 to produce an audio stream.

The baseband processor 225 encodes and decodes digital data sent and received by the transceiver 230. The transceiver 230 transmits and receives radio signals to and from various wireless communications networks (for example, the network 105) using the antenna 235. The electronic processor 205, the baseband processor 225, and the transceiver 230 may include various digital and analog components, which for brevity are not described herein and which may be implemented in hardware, software, or a combination of both. Some embodiments include separate transmitting and receiving components, for example, a transmitter and a receiver, instead of a combined transceiver 230.

The push-to-talk button 240 is a mechanical input mechanism, for example, a momentary switch that places the communication device 110 into a transmit mode when the momentary switch is pressed and places the communication device 110 into a reception mode when the momentary switch is released. In the transmit mode, the communication device 110 transmits an audio stream produced by the electronic processor 205 from electrical signals received from the microphone 220 via the transceiver 230 and the antenna 235 to one or more other electronic communication devices (for example, the ambient monitoring device 120) through the network 105.

Some embodiments of the communication device 110 include, as an alternative or in addition to the push-to-talk button 240, a push-to-talk application 245 (for example, stored in the memory 210 for retrieval and execution by the electronic processor 205). In some embodiments, the push-to-talk application 245 generates and displays a soft push-to-talk button on a graphical user interface on a touchscreen (not shown) of the communication device 110. The soft push-to-talk button, like the push-to-talk button 240, is used to activate a transmit mode of the communication device 110.

Regardless of whether transmit mode is triggered by a mechanical or software button, the communication device 110 uses a target identity 250 to communicate using push-to-talk services over the network 105. The target identity 250 may be an identity of a user logged into the communication device 110 or the identity of the communication device 110 itself. For example, in a Long Term Evolution (LTE) wireless network, the target identity 250 may be a Session Initiation Protocol (SIP) Uniform Resource Identifier (URI) for a user of the communication device 110 or for the communication device 110 itself. In another example, in a land mobile radio (LMR) network, the target identity 250 may be a Subscriber Unit Identity (SUID). As described herein, some embodiments of the communication device 110 may use more than one or one type of the target identity 250. Push-to-talk communications are directed to and sent from the communication device 110 using the target identity 250. For example, another communication device may open a push-to-talk communication channel with the communication device 110 by addressing the target identity 250.

In some embodiments, the communication device 110 is a portable two-way radio. In other embodiments, the communication device 110 may be a smart telephone, a tablet computer, or another portable or mobile electronic device containing software and hardware enabling it to communicate via the network 105 using push-to-talk functionality. In some embodiments, the communication device 110 is a converged device, combining, for example, features of a smart telephone and a portable two-way radio. In such embodiments, the communication device 110 includes hardware and software for registering with and communication through more than one network type within the network 105. For example, the network 105 may include a cellular (for example, Long Term Evolution) network and a land mobile radio network. The communication device 110 may have push-to-talk functionality on one or both of the cellular and land mobile radio networks. In some embodiments, the communication device 110 may be connected to an accessory device that includes a microphone and a push-to-talk switch such as, for example, a remote speaker microphone (not shown). In such embodiments, ambient monitoring sessions may be established by activating the push-to-talk function of the accessory device.

Returning to FIG. 1, the first ambient monitoring session 135 may be established in the event that public safety personnel to wish to monitor an incident in progress. In some cases the personnel may wish to surreptitiously monitor the incident. For example, in a hostage situation, it may not be advisable to alert the captors that audio from the area is being transmitted to authorities. In another example, a supervisor may wish to monitor a subordinate without audible communications. In other cases, there may be concern that those near the communication device 110 are in need of medical care, but are unable to communicate. The benefits that are achievable through ambient monitoring may be diminished by interruptions in communications. For example, if the communication device 110 switches between a cellular and a land mobile radio network during the incident a disruption may occur. In addition, a disruption may occur when a user logs in or out of the communications device 110. In both cases, the target identity for the device's push-to-talk function may change.

Figure 3:
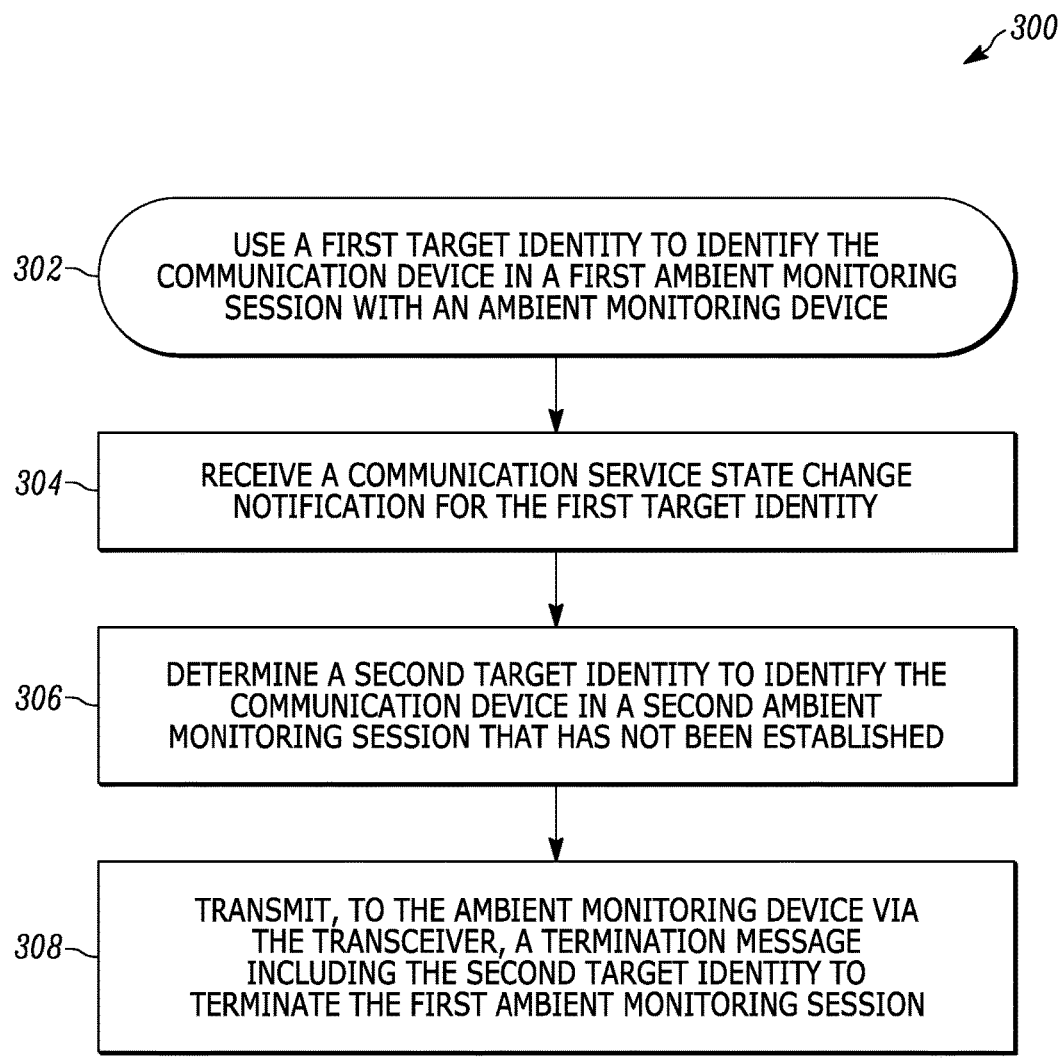
FIG. 3 is a flowchart of a method of maintaining ambient monitoring capability for a communication device in accordance with some embodiments.
Figure 4:
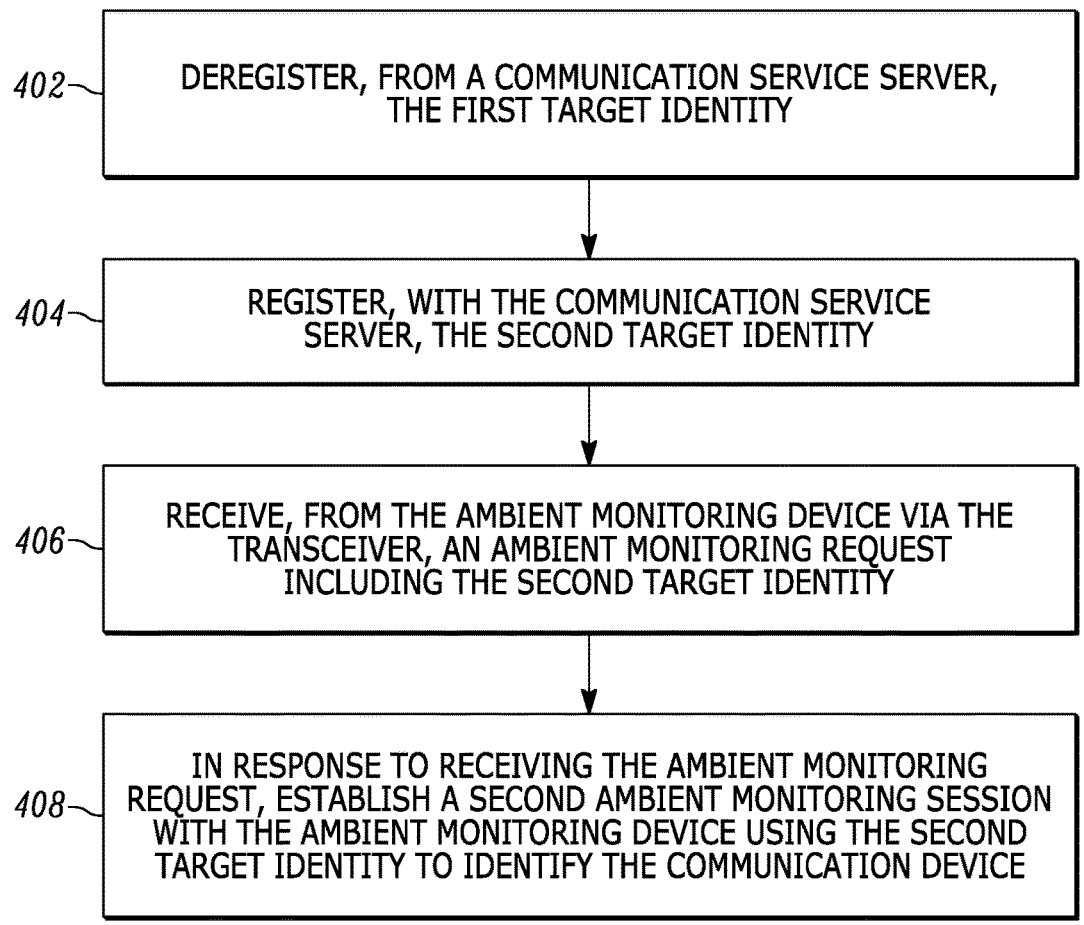
FIG. 4 is a flowchart of a method of establishing an ambient monitoring session in accordance with some embodiments.

Accordingly, FIG. 3 and FIG. 4 illustrate methods for maintaining ambient monitoring capability for the communication device 110 when, among other things, the target identity changes. The methods are described with respect to FIG. 5, which illustrates an exemplary message flow for the system 100. As an example, the methods are explained in terms of the electronic processor 205 of the communication device 110. Other embodiments of the methods may be performed on multiple processors within the same device or on multiple devices.

FIG. 3 illustrates an exemplary method 300 for maintaining ambient monitoring capability for the communication device 110. At block 302, the electronic processor 205 uses a first target identity to identify the communication device in the first ambient monitoring session 135 with the ambient monitoring device 120. As illustrated, during the first ambient monitoring session 135, the communication device 110 transmits an ambient audio stream 502 to the ambient monitoring device 120. The media path may be direct between the communication device 110 and the ambient monitoring device 120, or it may pass through the communications service server 115. In some embodiments, an ambient video stream may be transmitted in the first ambient monitoring session 135. In such embodiments, the communication device 110 includes hardware for capturing a video stream (for example, an image capture device and an image processor).

While in the first ambient monitoring session 135 (that is, while the first ambient monitoring session 135 is active), the electronic processor 205, at block 304, receives a communication service state change notification for the first target identity. The communication service state change notification (for example, a push-to-talk state change notification) notifies the electronic processor 205 that the communication service used by the first ambient monitoring session (for example, the push-to-talk service) will be moving to a new target identity (for example, a push-to-talk identity). In some embodiments, receiving a communication service state change notification includes receiving a login state change for a user. A login state change may be an indication from, for example, the push-to-talk application 245 that a currently logged-in user has requested a log out, or that a new user is logging in. In some embodiments, receiving a communication service state change notification includes receiving a network state change. A network state change may be, for example, an indication from the baseband processor 225 or the transceiver 230 that the communications device 110 will soon migrate to a different network, which would result in the use of a different target identity than the first target identity.

At block 306, the electronic processor 205 determines a second target identity to identify the communication device 110 in a second ambient monitoring session that has not been established (for example, the second ambient monitoring session 512, that will be established using a second push-to-talk identity). The electronic processor 205 determines the second target identity based on the communication service state change notification received at block 304. For example, when the notification indicates that a new login has been requested, the second target identity (for example, a new user identity) will be based on the new login. In another example, when the notification indicates that a logout has been requested, the second target identity is the target identity of the communication device 110 itself. When the notification indicates a network state change, the second target identity will be based on the target identity used by the communication device 110 for the type of network being moved to (for example, a device identity or a subscriber unit identifier).

At block 308, the electronic processor 205 transmits, to the ambient monitoring device 120, a termination message 504 including the second target identity to terminate the first ambient monitoring session 135. The transmission of the termination message 504 occurs within the first ambient monitoring session 135. In some embodiments, the termination message 504 is transmitted on a signaling path through the communications service server 115 to the ambient monitoring device 120. When the termination message 504 is received by the ambient monitoring device 120, the first ambient monitoring session 135 is terminated, and the ambient audio stream 502 stops transmitting.

In some embodiments, the second target identity is transmitted as a separate message apart from the termination message. Regardless of how it is sent, the second target identity is transmitted within the first ambient monitoring session 135, prior to the termination of the session.

FIG. 4 illustrates an exemplary method 400 for establishing an ambient monitoring session (for example, the ambient monitoring session 512) between the communication device 110 and the ambient monitoring device 120. At block 402, the electronic processor 205 deregisters, with the communication service server 115, the first target identity. In one embodiment, the electronic processor 205 sends a deregister message 506, including the first target identity, to the communications service server 115. Once deregistered, the communication device 110 does not have push-to-talk service available on the network 105. Accordingly, at block 404, the electronic processor registers, with the communication service server 115, the second target identity. In one embodiment, the electronic processor 205 sends a register message 508, including the second target identity, to the communications service server 115. Once registered, the communication device 110 is able to communicate using push-to-talk services on the network 105. At block 406, the electronic processor receives, from the ambient monitoring device, an ambient monitoring request 510 including the second target identity. At block 408, in response to receiving the ambient monitoring request 510, the electronic processor 205 establishes the second ambient monitoring session 512 with the ambient monitoring device using the second target identity to identify the communication device 110. When the second ambient monitoring session 512 is established, the electronic processor 205 again transmits the ambient audio stream 502.

Accordingly, using the methods described herein, the communication device 110 can maintain ambient monitoring capability when a communication service state change occurs.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes," "including," "contains," "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a," "has . . . a," "includes . . . a," or "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially," "essentially," "approximately," "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A method for maintaining ambient monitoring capability for a communication device, the method comprising:
   using a first target identity to identify the communication device in a first ambient audio monitoring session with an ambient monitoring device;
   while in the first ambient audio monitoring session,
      receiving, by an electronic processor of the communication device, a communication service state change notification for the first target identity;
      determining a second target identity to identify the communication device in a second ambient audio monitoring session that has not been established; and
      transmitting, to the ambient monitoring device, the second target identity.

2. The method of claim 1, further comprising:
   transmitting, to the ambient monitoring device, a termination message to terminate the first ambient audio monitoring session.

3. The method of claim 2, further comprising:
   in response to the termination of the first ambient audio monitoring session,
      deregistering, from a communication service server, the first target identity; and
      registering, with the communication service server, the second target identity.

4. The method of claim 3, further comprising:
   receiving, from the ambient monitoring device, an ambient monitoring request including the second target identity; and
   in response to receiving the ambient monitoring request, establishing a second audio ambient monitoring session with the ambient monitoring device using the second target identity to identify the communication device.

5. The method of claim 1, wherein receiving a communication service state change notification includes receiving one selected from a group consisting of a login state change for a user and a network state change.

6. The method of claim 1, wherein determining a second target identity includes determining one selected from a group consisting of a new user identity, a device identity, and a subscriber unit identifier.

7. The method of claim 1, wherein transmitting the second target identity includes transmitting a termination message including the second target identity.

8. The method of claim 1, wherein transmitting a termination message includes transmitting a termination message for at least one of a group consisting of an audio stream and a video stream.

9. The method of claim 1, wherein
   receiving a communication service state change notification for a first target identity includes receiving a push-to-talk service state change notification for a first push-to-talk identity; and
   deregistering from a communication service server includes deregistering from a push-to-talk server.

10. The method of claim 9, wherein
    determining a second target identity includes determining a second push-to-talk identity; and
    registering, with the communication service server includes registering, with the push-to-talk server, the second push-to-talk identity.

11. A system for maintaining ambient monitoring capability, the system comprising:
    a communication device including
       a transceiver, and
       an electronic processor configured to
          use a first target identity to identify the communication device in a first ambient monitoring audio session with an ambient monitoring device;
          while in the first ambient audio monitoring session,
             receive a communication service state change notification for the first target identity;
             determine a second target identity to identify the communication device in a second ambient audio monitoring session that has not been established; and
             transmit, to the ambient monitoring device via the transceiver, the second target identity.

12. The system of claim 11, wherein the electronic processor is configured to
    transmit, to the ambient monitoring device, a termination message to terminate the first ambient audio monitoring session.

13. The system of claim 12, wherein the termination message includes the second target identity.

14. The system of claim 12, wherein the electronic processor is configured to, in response to the termination of the first ambient audio monitoring session,
    deregister, from a communication service server, the first target identity; and
    register, with the communication service server, the second target identity.

15. The system of claim 11, wherein the electronic processor is configured to
receive, from the ambient monitoring device via the transceiver, an ambient monitoring request including the second target identity; and
in response to receiving the ambient monitoring request, establish a second audio ambient monitoring session with the ambient monitoring device using the second target identity to identify the communication device.

16. The system of claim 11, wherein the communication state change notification includes one selected from a group consisting of a login state change for a user and a network state change.

17. The system of claim 11, wherein the second target identity includes one selected from a group consisting of a new user identity, a device identity, and a subscriber unit identifier.

18. The system of claim 12, wherein the termination message includes a termination message for at least one of a group consisting of an audio stream and a video stream.

19. The system of claim 14, wherein
the communication service state change notification is a push-to-talk service state change notification for a first push-to-talk identity; and
the communication service server is a push-to-talk server.

20. The system of claim 15, wherein the second target identity includes a second push-to-talk identity.

* * * * *